(12) United States Patent
Roth et al.

(10) Patent No.: US 11,365,729 B2
(45) Date of Patent: Jun. 21, 2022

(54) METERING PUMP HAVING AN INTEGRATED OVERFLOW VALVE, AND VALVE INSERT FOR A METERING PUMP

(71) Applicant: Lutz-Jesco GmbH, Wedemark (DE)

(72) Inventors: Steffen Roth, Dorfprozelten (DE); Peter Bernard Militzer, Roderen (FR)

(73) Assignee: LUTZ-JESCO GMBH, Wedemark (DE)

( * ) Notice: Subject to any disclaimer, the term of this patent is extended or adjusted under 35 U.S.C. 154(b) by 24 days.

(21) Appl. No.: 16/720,107

(22) Filed: Dec. 19, 2019

(65) Prior Publication Data

US 2020/0200167 A1 Jun. 25, 2020

(30) Foreign Application Priority Data

Dec. 20, 2018 (DE) .................... 10 2018 133 214.9
Jul. 25, 2019 (DE) .................... 20 2019 104 111.0

(51) Int. Cl.
*F04B 49/22* (2006.01)
*F04B 53/10* (2006.01)
*F16K 17/04* (2006.01)

(52) U.S. Cl.
CPC ........ *F04B 49/225* (2013.01); *F04B 53/1002* (2013.01); *F16K 17/0406* (2013.01)

(58) Field of Classification Search
CPC .... F04B 49/225; F04B 53/1002; F04B 53/06; F04B 13/00; F04B 43/02
See application file for complete search history.

(56) References Cited

U.S. PATENT DOCUMENTS

| 4,865,525 A * | 9/1989 | Kern ........................ F04B 43/02 417/307 |
| 2011/0114064 A1* | 5/2011 | Akita .................... F02M 55/007 123/495 |
| 2018/0259077 A1* | 9/2018 | Shinoyama ......... F16K 17/0406 |

FOREIGN PATENT DOCUMENTS

| CH | 457146 A | 5/1968 |
| DE | 3631964 C1 | 12/1987 |
| DE | 3827489 | 2/1991 |
| DE | 4219664 A1 | 12/1993 |
| DE | 19712096 C1 | 4/1998 |
| DE | 19726698 | 1/1999 |
| DE | 102005039237 A1 | 2/2007 |
| EP | 260464 A1 | 3/1988 |
| WO | WO9513473 A1 | 5/1995 |

* cited by examiner

*Primary Examiner* — Connor J Tremarche
(74) *Attorney, Agent, or Firm* — Von Rohrscheidt Patents

(57) ABSTRACT

An overflow valve is built into a metering head for a metering pump used with aggressive media and under high pressure. The overflow valve follows the suction valve or expands it, and directly lowers a critical pressure that occurs in the metering head, using an overflow line. In this way, the safety of the arrangement is improved, and at the same time, less construction space is used up by the additional valve.

6 Claims, 3 Drawing Sheets

METERING PUMP HAVING AN INTEGRATED OVERFLOW VALVE, AND VALVE INSERT FOR A METERING PUMP

CROSS REFERENCE TO RELATED APPLICATIONS

Applicant claims priority under 35 U.S.C. § 119 of German Application No. 10 2018 133 214.9 filed Dec. 20, 2018 and German Application No. 20 2019 104 111.0 filed Jul. 25, 2019, the disclosures of which are incorporated by reference.

BACKGROUND OF THE INVENTION

1. Field of the Invention

The present invention relates to a metering pump having a metering head, which is closed off with a suction valve on the suction side and with a pressure valve on the pressure side, wherein a membrane is arranged for alternating generation of a partial vacuum and of an excess pressure in the metering head. The present invention also relates to a valve insert for such a metering pump.

2. Description of the Related Art

Such metering pumps have already represented the standard state of the art for a long time. They are always preferably used when aggressive chemicals are supposed to be metered in leakage-free manner, when great repeat accuracy is required, and when pumping must take place against high pressures. Due to the aggressiveness of the chemicals that are metered at high pressures, suitable safety equipment is being required more and more frequently, so as to avoid critical excess pressures that occur in the system. In this regard, the safety equipment has the task of either monitoring the pressure or reducing the pressure when a pressure limit value has been reached.

Pressure monitoring can take place, in particular, using a pressure sensor installed into the metering head, the suction line, or the pressure line or directly into the process that follows the metering pump. In this regard, sensors and, in addition, evaluation electronics are required. The evaluation electronics can be included in a pump housing or in a remote control cabinet, together with a process controller. In each case, however, they must be data-connected with the sensors and must control the pump as a function of the sensor values. This type of monitoring is very expensive and requires a high level of installation effort.

In contrast, mechanical pressure limiting can be implemented using an overflow valve. In this regard, an additional valve is installed on the metering head or in the pressure line. A spring in the interior of the valve can be biased by way of a setting screw, and the operating pressure and a pressure limit value can be set using this screw. The spring force therefore corresponds to the opening pressure.

In the normal state, medium conveyed by the metering pump then flows through the valve. If the pressure at the valve now increases, in other words in the pressure line or in the metering head, a membrane opens an overflow channel, which guides the medium back into a medium container or into a separate collection container. If the pressure then drops again, the membrane closes the overflow channel again and the medium flows in the direction of the process once again. This solution, however, also provides that very great pressure occurs at first in the metering head or already in the pressure line. Aside from the increased wear that occurs as a result, placement of an additional fitting block having the said overflow valve requires additional construction space and additional lines to the fitting block and away from it.

SUMMARY OF THE INVENTION

Against this background, it is the object of the present invention to provide a solution that avoids excess pressure in the pressure line and allows any critical excess pressures that occur to be relieved directly at or in the metering head.

These and other objects are accomplished by means of a metering pump in accordance with the characteristics of one aspect of the invention, as well as by means of a valve insert for a metering pump in accordance with another aspect of the invention. Further practical embodiments of the metering pump can be derived from the disclosure below.

According to the invention, it is provided that an overflow valve is assigned to a metering pump in the region of its metering head, in addition to the suction valve and pressure valve required for proper functioning, by way of which overflow valve a critical excess pressure in the metering head can be relieved. If an upper pressure limit value is reached in the metering head, means for opening an overflow line trigger and open an access to this overflow line, which line leads out of the metering head. As a result, the pressure in the metering head drops below the upper pressure limit value subsequent to opening of the overflow line, and damage to the metering pump can be prevented in this manner.

In a variant of the invention, the overflow valve can be situated between suction valve and pressure valve, in concrete terms.

This variant is particularly advantageous because by means of this arrangement, the pressure can be lowered again directly at the location where it occurs, while in the case of the known state of the art, the pressure can be relieved only in a separate fitting block. In the case of the known state of the art, the pressure therefore remains in the metering head, and in spite of the relief in the pressure line, the excess pressure conditions in the metering head still occur.

The overflow line in turn can preferably be connected with or identical with the suction line on the side that faces away from the metering head, which line feeds the metering head, so that the medium never leaves the conveying circuit. Alternatively, however, the overflow line can also be connected with a container, for example an overflow container, or can lead directly back into the media container connected with the suction line.

If the overflow line is identical with the suction line, it can be particularly advantageous if the suction valve is actually formed in a structural unit with the overflow valve. In such a case, the suction valve can share a shut-off body, preferably a ball, with the overflow valve, so that this ball can leave its valve seat and thereby the shut-off position in both directions, in other words the suction direction and the pressure direction, going into a release position. In the pressure direction, the ball can escape as in the case of a conventional pressure valve, and in the case of a partial vacuum in the metering head, the ball can allow medium to enter into the metering head from the suction line, releasing the passage opening. In contrast, if the pressure increases in the pressure line, and as a result also in the metering head, the ball will return to the valve seat again. In the opposite direction, the ball is prevented from escaping out of its shut-off position by means of a pressure spring. In contrast, if the pressure in the metering head increases above a pressure limit value, the pressure spring allows escape of the ball also in the suction direction. Thereby, medium can be brought out of the metering head back into the suction line once again.

It has proven to be particularly advantageous if the overflow valve is arranged in the immediate vicinity of the suction valve. When medium is conveyed out of the metering head, the suction valve, for example in the form of a ball valve, is closed in any case, so that during the course of this resetting movement, the mechanics of an overflow valve can also be arranged. In this case, the overflow valve must be placed behind the suction valve in the conveying direction, so that after the suction valve closes, it is still exposed to the pressure in the metering head. If the overflow line is then opened, which line opens into a housing wall adjacent to the overflow valve, the overflowing medium can be passed out of the metering head by way of the overflow line.

In this configuration, the overflow valve can furthermore separate the suction valve from the interior of the metering head, so that consequently, a passage opening must be assigned to the overflow valve, through which opening the medium can be conveyed when medium is drawn in.

In a specific embodiment of the overflow valve, it can be structured as a plate valve, wherein the valve plate having the said passage opening is arranged in the path between the suction valve and the metering chamber of the metering head. An edge bulge of the valve plate then blocks access to the overflow line as long as the valve plate remains in its shut-off position. The valve plate is displaced from this shut-off position, into a release position, counter to the force of a pressure spring, only if the pressure in the metering head exceeds the upper pressure limit value. For this case, the passage opening of the plate valve can also have a kickback valve, so as to be able to build up different pressure potentials on both sides of the valve plate.

Furthermore, to influence the upper pressure limit value, it can be possible, to some advantage, to influence the pressure spring using setting means, preferably from outside of the metering head, so that the spring constant can be changed using the setting means. In this way, it is possible to adjust both the pressure to be set as the upper pressure limit value and the pressure at which the overflow valve opens up the access to the overflow line.

The overflow line in turn is preferably connected with the suction line on the side facing away from the metering head, which line feeds the metering head, so that the medium never even leaves the conveying circuit. Alternatively, however, the overflow line can also be connected with a container, for example an overflow container, or directly back into the media container connected with the suction line.

To particular advantage, the suction valve can be assigned to the metering head, in the form of a valve insert, as a whole, for example by way of a screw connection. In this case, the overflow valve can also be assigned to this valve insert, so that the valve insert holds both the suction valve and the overflow valve that is preferably connected with it. In this way, it is possible to retrofit the overflow valve into existing metering pumps, without problems, without having to undertake greater structural changes in the metering pump.

Such an adapted valve insert with an overflow valve having all the characteristics described above is also explicitly an object of the present invention.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
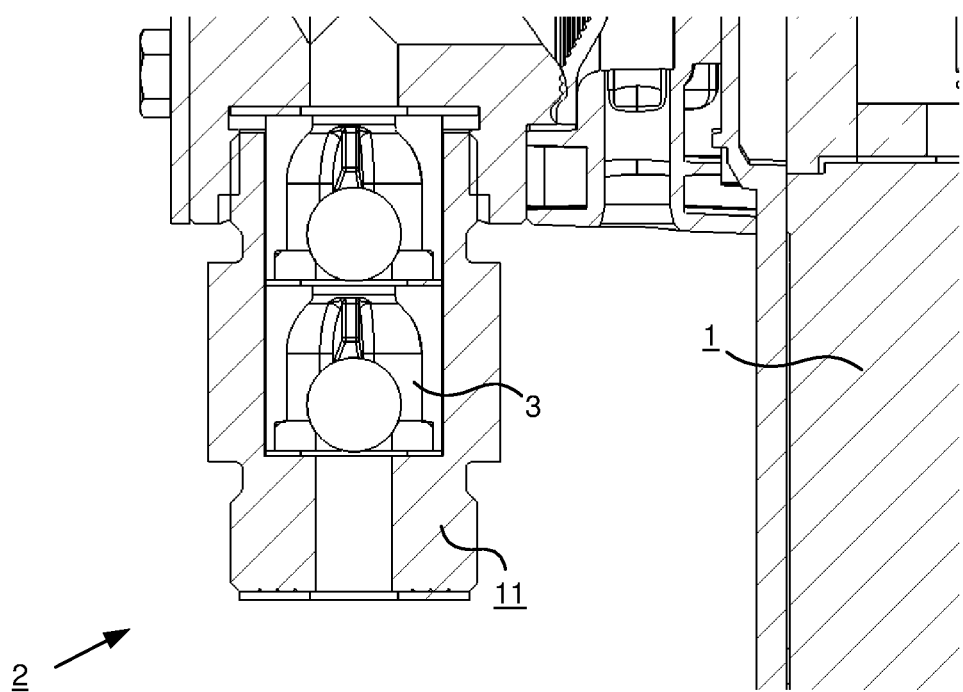
FIG. 1 shows the suction side of the metering head of a metering pump, having a suction valve according to the known state of the art, in a cross-sectional representation.

FIG. 1 shows a metering head 2 of a metering pump 1 as they are known in the state of the art. What is shown is a detail of the suction side of the metering head 2, which has a valve insert 11 that is connected with the metering head 2 by way of a screw connection.

Medium is drawn in from a media container into the metering head 2, using a membrane, by way of a suction line not shown here, wherein the valve insert 11 has a suction valve 3 here, structured as a two-stage ball valve. The partial vacuum that prevails in the metering head 2 and is generated by means of the membrane not shown here, opens the ball valves that are switched in series one behind the other, and allows the medium that is drawn in to flow into the metering head 2. Then the membrane will increase the pressure in the metering head 2 again after an end position is reached, and thereby the ball valves close and the medium is conveyed out by way of a pressure valve arranged in the pressure side, analogously but in the opposite direction.

If the pressure in the pressure line becomes too great, an overflow valve that might be used there will trigger and ensure lowering of the pressure in the pressure line. In contrast, an overly high pressure remains in effect in the metering head 2 in such a case.

Figure 2:
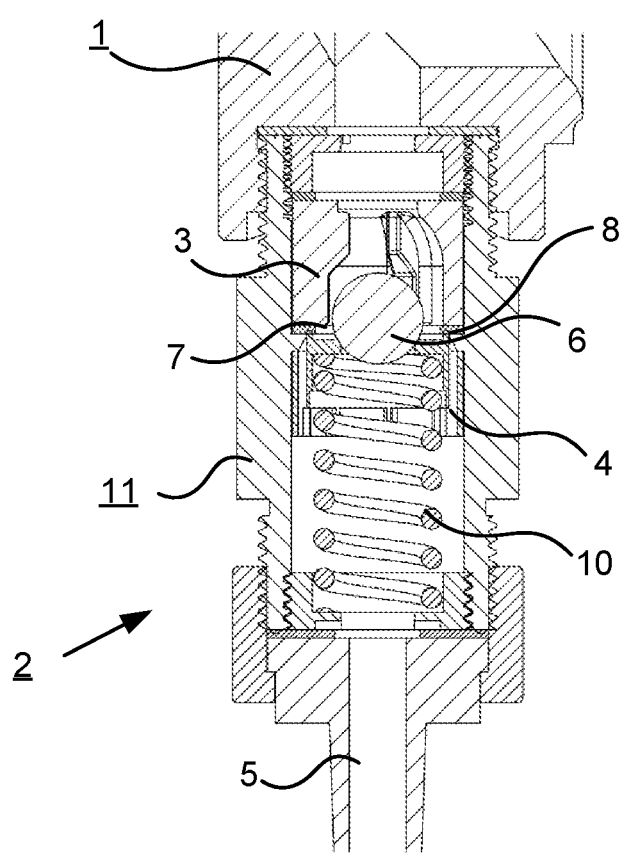
FIG. 2 shows the suction side of the metering head of a metering pump according to the invention, having a valve insert with an overflow valve, in a cross-sectional representation.

FIG. 2 shows the solution according to the invention, which distinguishes itself from the state of the art by means of the valve insert 11 that is used. In this regard, the valve insert 11 has a suction valve 3 and an overflow valve 4 assigned to the suction valve 3 in structurally unified manner, which valves have a ball 6 as a common shut-off body. This ball 6 lies in its valve seat 8 in a pressure-free situation, and thereby blocks the passage opening 7. During operation of the metering pump 1, in the case of a dropping pressure in the metering head 2, the ball is moved out of the valve seat 8 into a release position in the pressure direction, and medium is drawn into the metering head 2 due to the partial vacuum that occurs in it. When the pressure increases again during normal operation, then the ball 6 moves back into the valve seat 8. Due to a pressure spring 10, it does not leave the valve seat 8 in the suction direction, but rather is held in the shut-off position.

If, instead, the pressure continues to increase in the pressure line, and consequently also in the metering head 2, then if a pressure limit value is reached and exceeded, the ball 6 is pressed against the pressure spring 10 at a pressure that ensures escape in the suction direction, in other words toward the suction line. Medium from the metering head 2 can flow out into the suction line through the passage opening that has become free as a result, so that an overly high pressure in the metering head 2 can be prevented.

Figure 3:
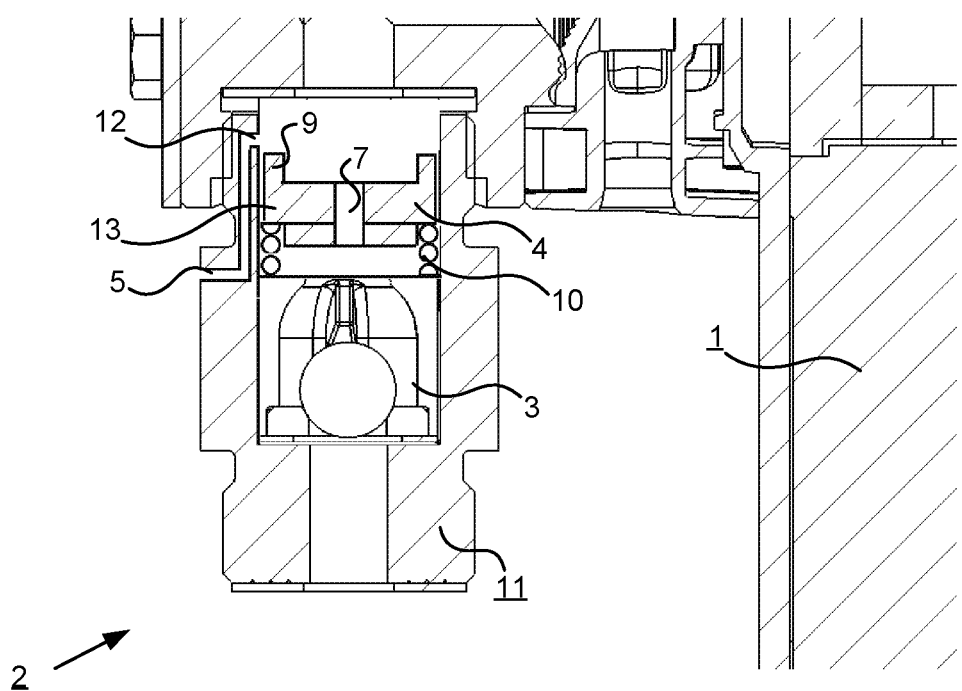
FIG. 3 shows a variant of the suction side of the metering head according to FIG. 2, having a valve insert with an overflow valve, in a cross-sectional representation.

FIG. 3 shows an alternative embodiment of the solution according to the invention, which distinguishes itself from the state of the art by means of the valve insert 11 that is used. The valve insert 11 furthermore has a two-stage valve, wherein, however, only the valve stage that is first in the flow direction, in other words the one that lies on the outside, is structured as a suction valve 3, here in the form of a ball valve. The valve stage that lies on the inside is structured as an overflow valve 4, and in a shut-off position closes off an overflow line 5, the access 12 of which is accessible for medium contained in the metering head 2 in the release position shown.

The overflow valve 4 is structured as a plate valve, the valve plate 13 of which has a central passage opening, through which the medium coming from the suction valve can be conveyed in the shut-off position, but which in turn can be provided with a kickback valve in a manner not shown here. If a pressure builds up in the metering head 2, which pressure reaches an upper pressure limit value, then not only does the suction valve 3 close, but rather the overflow valve 4 opens up the overflow line 5. For this purpose, the valve plate 13 is displaced into the release position counter to the force of the pressure spring 10, which determines the upper pressure limit value, due to the pressure in the metering head 2. In this regard, an edge bulge 9 of the valve plate 13, which had blocked the access 12 to the overflow line 5 until then, moves away from the access 12, and the medium can be guided, in addition to the pressure valve, also out of the metering head 2 by way of the overflow line, for example back into the suction line or the media container, so that the pressure in the metering head can be relieved again.

What has been described above is therefore a metering pump in which an excess pressure in the pressure line is prevented and any critical excess pressures that occur can be relieved directly at or in the metering head. These results are achieved by means of an overflow valve that directly precedes or follows the suction valve, which overflow valve guides medium directly out of the metering head when a pressure limit value is reached, and thereby directly lowers the pressure below the pressure limit value again.

Although only a few embodiments of the present invention have been shown and described, it is to be understood that many changes and modifications may be made thereunto without departing from the spirit and scope of the invention.

What is claimed is:

1. A metering pump comprising:
   a metering head including a valve insert;
   a suction valve arranged in the valve insert and including a suction valve seat and a suction valve shutoff body;
   a pressure valve arranged in the valve insert coaxial with the suction valve and including a pressure valve seat and a pressure valve shutoff body,
   wherein the valve insert includes a suction side and a pressure side, wherein the valve insert is closed off by the suction valve on the suction side and by the pressure valve on the pressure side so that the suction valve closes in the valve insert when a pressure on the pressure side exceeds a pressure on the suction side and the suction valve opens in the valve insert when the pressure on the suction side exceeds the pressure on the pressure side;
   a membrane arranged for alternating generation of a partial vacuum and of an excess pressure in the metering head;
   an overflow line leading out of the metering head,
   wherein the pressure valve opens up the overflow line leading out of the metering head when an upper pressure limit value is reached in the metering head, wherein the suction valve seat is provided integrally in one piece with the pressure valve shutoff body in the valve insert, wherein a ball forms the suction valve shut-off body, wherein the ball is movable out of the suction valve seat in the valve insert in a suction direction; and
   a pressure spring, wherein the pressure valve shutoff body is movable out of the pressure valve seat in the pressure direction only against a force of the pressure spring, as soon as interior pressure of the metering head exceeds pressure limit value so that the ball moves with the pressure valve shutoff body in the valve insert when the pressure valve shutoff body moves, and
   wherein the pressure valve shutoff body and the ball of the suction valve move coaxial in the valve insert.

2. The metering pump according to claim 1, wherein the overflow line is connected with a suction line connected with the metering head on the suction side, or with a media container wherein a free end of the suction line opens into the media container.

3. The metering pump according to claim 1, wherein the overflow line is identical to the suction line.

4. The metering pump according to claim 1, further comprising a setting device, wherein the pressure limit value is adjustable by way of a spring constant of the pressure spring, using the setting device.

5. The metering pump according to claim 1, wherein the overflow line is connected with a suction line that is connected with the metering head on the suction side.

6. The metering pump according to claim 2, wherein the overflow line is connected with the media container.

\* \* \* \* \*